United States Patent [19]

Gittinger

[11] 3,775,704

[45] Nov. 27, 1973

[54] HYBRID FILTER

[75] Inventor: Norman C. Gittinger, Schenectady, N.Y.

[73] Assignee: General Electric Company, Schenectady, N.Y.

[22] Filed: Jan. 2, 1973

[21] Appl. No.: 320,009

[52] U.S. Cl. .................... 333/11, 333/70 R, 333/75, 333/77

[51] Int. Cl. ........ H01p 5/14, H03h 7/10, H03h 7/14

[58] Field of Search ........................ 333/6, 11, 70 R, 333/75, 77; 179/15 FD

[56] References Cited

UNITED STATES PATENTS 2,115,138 4/1938 Darlington ........................ 333/77 X 3,593,209 7/1971 Gittinger ............................... 333/11

*Primary Examiner*—Rudolph V. Rolinec
*Assistant Examiner*—Marvin Nussbaum
*Attorney*—Louis A. Moucha et al.

[57] ABSTRACT

A hybrid filter having the characteristics of a hybrid coupler and high and low pass filters combined. The hybrid filter provides high pass and low pass frequency ports and employs a complementary filtering and phase inversion means such as a center-tapped inductor to isolate and confine the high and low frequencies to their respective ports. The hybrid filter provides a constant input impedance at all frequencies by employing reactive elements of critical values.

4 Claims, 2 Drawing Figures

HYBRID FILTER

BACKGROUND OF THE INVENTION

1. Field of the Invention

This invention relates to wave transmission networks and more particularly to coupling networks having wave filters which include filtering and phase inverting means.

2. Description of Prior Art

In communication systems such as cable television systems, messages are sent in both directions over a single transmission line. This is accomplished by transmitting the messages traveling in one direction at frequencies within a low frequency band and transmitting the messages traveling in the other direction at frequencies within a high frequency band. When the messages are to be utilized, the communication system must provide a device for splitting or separating the high and low frequency bands. The separating function is provided by high and low frequency filters which pass certain frequencies while stopping or rejecting other frequencies. In addition, related devices must be provided to perform the opposite function of combining or coupling the high and low frequency bands for transmission on the single transmission line. Hybrid filters are devices which may be used to separate certain frequency bands and to couple certain frequency bands onto a single transmission line.

The losses of the transmission lines of a communication system causes signal strength or amplitude of the messages to be attenuated during transmission. Amplifiers must be provided at regular intervals throughout the system to boost the signal strength. The amplifiers employed are generally limited in effective operation to certain frequency ranges, and for this reason the messages must be split into high and low frequency bands so that they may be effectively amplified. After amplification the frequency bands are coupled onto a single transmission line. The hybrid filter must effectively isolate the power added to the individual frequency bands to prevent detrimental effect on the remaining frequency bands.

Closed loops involving amplifiers and the hybrid filters are employed at the amplifying stations. If the closed loop gain should become greater than one, the system will begin to oscillate and destroy its ability to carry communications. To eliminate oscillations, the attenuation of the hybrid filters from the high pass port to the low pass port must remain high at all frequencies thereby preventing any increase in the designed closed loop gain to a value greater than one. In addition, a constant input impedance equal to the characteristic impedance of the transmission line is the optimum for maximum power transfer throughout the communication system. Maximum power transfer makes the communication system more efficient and reduces the number of amplifying stations required.

The above discussion relates generally to the desirable characteristics of hybrid filters. A hybrid filter having these characteristics is described in U.S. Pat. No. 3,593,209, assigned to the assignee of the present invention. This patent describes a hybrid filter comprising two low pass filters, two high pass filters, and a phase inverting center-tapped inductor, all connected in the configuration of an electric bridge. The high and low pass filters form arms of the bridge and the inductor serves as the mid-point junction of two arms of the bridge.

The present invention is an improvement of the bridge design for the hybrid filter shown in the aforementioned patent. The present invention employs a filtering and phase inverting means in one arm of the bridge configuration. The filtering and phase inverting means becomes a circuit element to increase range of the low frequency response of the hybrid filter and make another connection port to the hybrid filter more convenient for circuit use.

SUMMARY OF THE INVENTION

It is an object of this invention to provide a hybrid filter which effectively separates low frequency bands from high frequency bands.

It is another object of this invention to provide a hybrid filter having the capability of transmitting frequencies as low as zero frequency.

It is another object of this invention to provide a hybrid filter having a constant input impedance at all frequencies equal to the characteristic impedance of a transmission line to which it is connected.

It is a further object of this invention to provide a hybrid filter having a reduced number of reactive elements and an additional connection terminal at a reduced cost.

To achieve these and other objects, one form of the present invention comprises a hybrid filter having two low pass filter means, a high pass filter means, and a complementary filtering and phase inversion means connected as arms of an electric bridge. The low pass filter means may be, for example, low pass T filters, and the high pass filter means may be, for example, a high pass T filter. The complementary filtering and phase inversion means has a frequency band pass characteristic similar to the high pass filter means in addition to having the capability of phase inverting certain frequencies. The hybrid filter bridge arrangement effectively separates the low frequency bands from the high frequency bands by eliminating any undesired frequencies falling within these bands, exhibits a constant input impedance at all frequencies equal to the characteristic impedance of the transmission line, transmits frequencies as low as zero frequency, and makes available an additional connection terminal at a reduced cost.

BRIEF DESCRIPTION OF THE DRAWINGS

A more complete understanding of the invention may be had by referring to the accompanying detailed description and drawings in which.

DETAILED DESCRIPTION OF THE INVENTION

Figure 1:
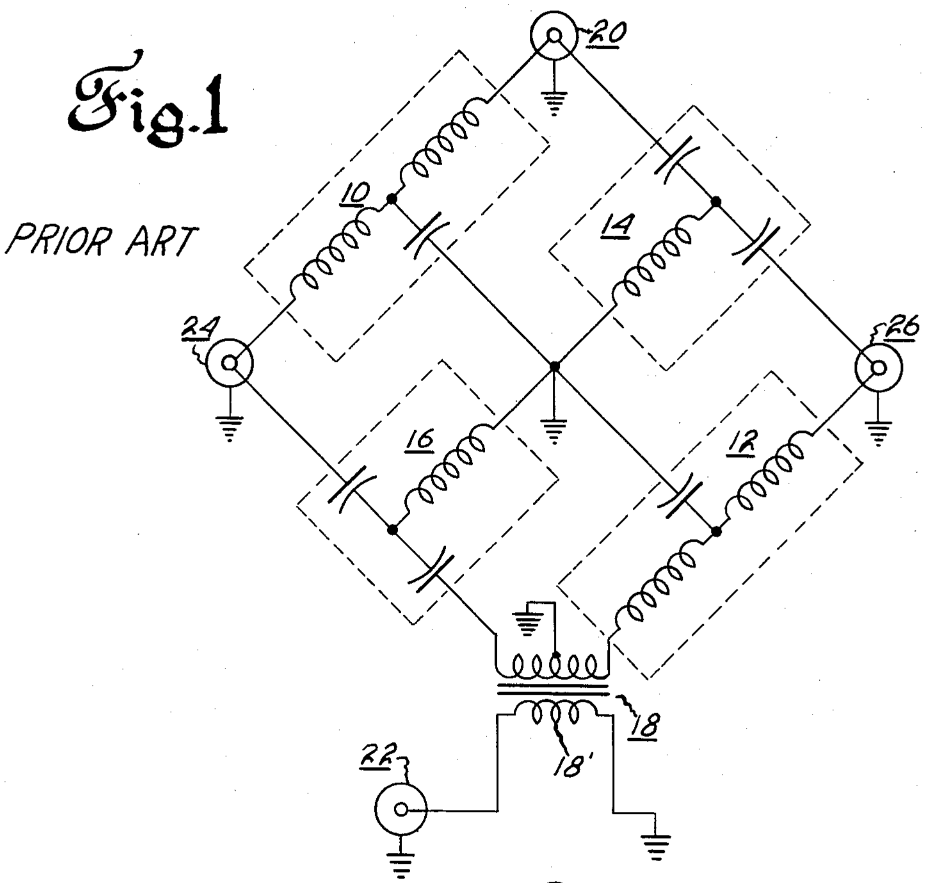
FIG. 1 is a schematic diagram of a prior art hybrid filter.

Referring to FIG. 1, a prior art hybrid filter having the configuration of an electric bridge is shown. Two low pass filters 10 and 12, two high pass filters 14 and 16, and a center-tapped inductor 18 form arms of the bridge. The center-tapped inductor 18 joins the arms formed by the high pass filter 16 and the low pass filter 12, and the elements 12, 16, and 18 form a complementary filtering and phase inversion means. Signal ports are provided at the junction of each of the arms of the bridge and an additional port is provided by connecting a secondary winding 18′ to the center-tapped inductor 18. The four ports are designated as a first common port 20, a second common port 22, a low pass port 24 and a high pass port 26, although as seen from the symmetry of the circuit, any of the four ports could be defined as the first common port.

In operation, signals of all frequencies are applied to the first common port 20 from a transmission line. The low pass filter 10 separates and directs frequencies within a low frequency band to the low pass port 24 and the high pass filter 14 directs frequencies of a high frequency band to the high pass port 26. Similarly, high frequency amplified signals applied to the high pass port 26 will be coupled to the transmission line connected to the first common port 20 by the high pass filter 14, and low frequency signals applied to the low pass port 24 will be directed to the first common port 20 by the low frequency filter 10. The hybrid filter operates to reduce any undesired frequencies from the low pass port 24 or the high pass port 26. Consider, for example, the presence of a high frequency at the low pass port 24, which might result from the harmonics in an amplifier. The high pass filter 16 directs this undesired high frequency to the center-tapped inductor 18 where it is phase inverted. The low pass filters 10 and 12 resist the transmission of the undesired high frequency and the phase inverted undesired high frequency, respectively. However, if some of the undesired high frequency should be transmitted, the undesired high frequency is reduced in magnitude at the first common port 20 and is cancelled at the high pass port 26. The cancellation is a result of the combination of the undesired high frequency and the phase inverted undesired high frequency. The high frequency filter 14 transmits the undesired high frequency between the ports 20 and 26 so that cancellation will occur at port 26. The undesired high frequency energy is absorbed by a load resistor connected to the second common port 22.

The foregoing description illustrates how an undesired frequency appearing at the low pass port 24 will be eliminated at the high pass port 26 of the hybrid filter. Similar operation will prevent any undesired low frequency at high pass port 26 from being transmitted to low pass port 24. The hybrid filter further operates in a similar manner to insure that only the low frequency bands are transmitted to the low pass port 24 and that the high frequency bands are transmitted to the high pass port 26. Any undesired frequency such as a high frequency appearing at the low pass port 24 or a low frequency appearing at the high pass port 26 will similarly be canceled at the port where the frequencies are not desired.

The cancellation property of the hybrid filter operates at all frequencies. Any frequency applied to the first common port 20 will be cancelled at the second common port 22. Any frequency applied to the second common port 22 will be cancelled at the first common port 20. Any frequency applied to the low pass port 24 will be cancelled at the high pass port 26. Any frequency applied to the high pass port 26 will be cancelled at the low pass port 24.

The center-tapped inductor 18 limits the ability of the second common port 22 to conduct zero frequency signals. The center-tapped inductor 18 will only induce a signal in the secondary winding 18′ if that signal is of a finite frequency. Therefore, zero frequency or DC signals cannot be made available at the second common port 22 for circuit use. The improved form of the present invention shown in FIG. 2 is operable to transmit a zero frequency or DC signal for circuit use and has the added feature of eliminating an added circuit element.

Figure 2:
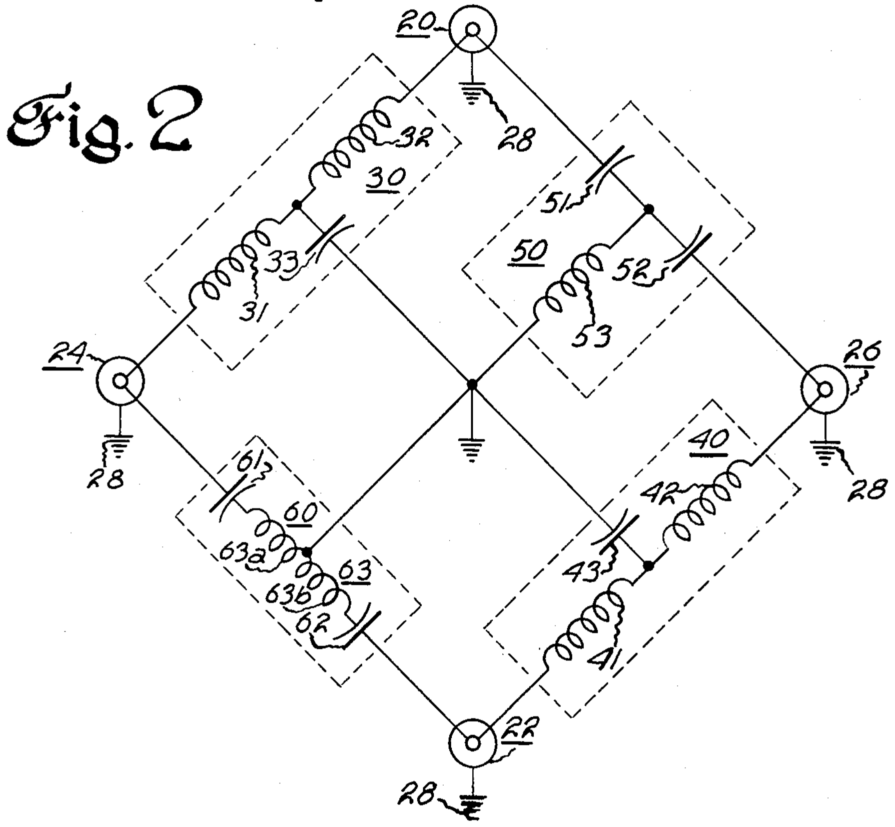
FIG. 2 is a schematic diagram of an improved hybrid filter comprising the present invention.

In FIG. 2 a hybrid filter formed in the configuration of an electric bridge is shown. The four arms of the bridge are formed by a first low pass filter means 30, a second low pass filter means 40, a high pass filter means 50, and a complementary filtering and phase inversion means 60. The arms of the bridge are joined at four ports, designated by the same reference numerals as in FIG. 1, where electrical signals may be applied or received. The first low pass filter means 30 is electrically connected between the first common port 20 and the low pass port 24. The second low pass filter means 40 is electrically connected between the second common port 22 and the high pass port 26. The high pass filter means 50 is electrically connected between the input port 20 and the high pass port 26. The complementary filtering and phase inversion means 60 is electrically connected between the second common port 22 and the high pass port 24.

The first low pass filter means 30 is a low pass T filter comprising inductors 31 and 32 and a capacitor 33. Inductors exhibit low impedance at low frequencies and capacitors exhibit high impedance at low frequencies. The T arrangement provides that low frequencies will be readily transmitted between the first common port 20 and the low pass port 24. The high impedance of the inductors inhibits transmission of high frequencies and the low impedance of capacitor 33 shunts high frequencies to a common terminal 28. The second low pass filter means 40 comprises inductors 41 and 42 and a capacitor 43. The operation of the second low pass filter means 40 is similar to that of the first low pass filter means 30. The first and second low pass filter means have substantially identical band pass frequency responses predetermined by the values of the capacitors and inductors used. The band pass frequency responses of the filter means 30 and 40 are a range of low frequencies which are transmitted without significant attenuation. Frequencies outside the band pass frequency response are greatly attenuated. Thus, the low pass filter means 30 and 40 readily conduct low frequencies while inhibiting frequencies out side their band pass frequency responses.

The high pass filter means 50 includes a high pass T filter comprising capacitors 51 and 52 and an inductor 53. The T arrangement provides that high frequencies will be readily transmitted between the first common port 20 and the high pass port 26. The high impedance of the capacitors 51 and 52 inhibits transmission of low frequencies and the low impedance of the inductor 53 shunts low frequencies to the common terminal 28. The band pass frequency response of the high pass T filter allows only frequencies substantially higher than the frequency response of the low pass filter means 30 and 40 to be passed without attenuation.

The complementary filtering and phase inversion means 60 is employed in one arm of the bridge. This means comprises a first capacitor 61, a second capacitor 62, and a center-tapped inductor 63. Capacitors 61 and 62 exhibit low impedances to high frequency signals and the center-tapped inductor 63, functioning as a transformer, causes high frequency signals to be transmitted through the complementary filtering and phase inversion means 60 without attenuation. The high impedance of capacitors 61 and 62 and the low impedance of the center-tapped inductor 63 cause significant attenuation of the low frequencies. The high frequency signals transmitted without attenuation form a band pass frequency response which is substantially identical to the band pass frequency response and low frequency attenuation characteristics of the high pass filter means 50.

The complementary filtering and phase inversion means 60 has a capability for phase inverting undesired frequencies. The windings 63*a* and 63*b* of the center-tapped inductor 63 are connected to phase invert any undesired frequencies to effect cancellation of the undesired frequencies as can be understood from the description of operation.

The use of the center-tapped inductor 63 as a circuit element in the complementary filtering and phase inversion means 60 provides an additional direct connection terminal to the hybrid filter at the second common port 22. The band pass frequency response of the low pass filter means 40 is extended to zero frequency due to the direct current conducting capability of the inductors 41 and 42 and of the second common port 22. In addition, the use of the center-tapped inductor 63 eliminates the need for the inductor in the high pass filter 16 in the prior art hybrid filter of FIG. 1, thereby making the present invention more economical to manufacture.

The hybrid filter of FIG. 2 operates as follows. A signal having both high and low frequencies is applied at the first common port 20. The high pass filter means 50 transmits the high frequencies to the high pass port 26 while inhibiting low frequencies. The low pass filter means 30 transmits low frequencies to the low pass port 24 while inhibiting high frequencies. The operation of the hybrid filter thus far described separates the high and low frequency signals and acts as impedance to isolate the high and low frequencies.

The hybrid filter further acts to reduce or eliminate the effect of undesired frequencies. The undesired frequencies at the low pass port are frequencies higher than the band pass frequency response of the low pass filter means, and the undesired frequencies at the high pass port are frequencies lower than the band pass frequency response of the high pass filter means. The undesired frequencies are reduced or eliminated by the complementary filtering and phase inversion means 60. For example, consider an undesired low frequency preset at the high pass port 26. The undesired low frequency is readily conducted by the second low pass filter means 40 to the second common port 22 where its energy is absorbed by a loading means connected to port 22. The high pass filter means 50 and the complementary filtering and phase inversion means 60 inhibit the transmission of the low frequency, but should the undesired low frequency be inadvertently transmitted through the means 50 and 60, the low frequency passing through the complementary filtering and phase inversion means 60 will be phase inverted. The low pass filter means 30 readily transmits either the undesired low frequency or the phase inverted undesired low frequency between the first common port 20 and the low pass port 24. The undesired low frequency and the phase inverted undesired low frequency cancel each other at the low pass port 24 to eliminate the effect of the undesired frequency. Partial cancellation reduces the magnitude of the undesired low frequency at the first common port 20. Similarly, if an undesired high frequency is present at the low pass port 24, the undesired high frequency is readily transmitted and phase inverted by the complementary filtering and phase inverting means 60. The first low pass filter means 30 inhibits transmission of the phase inverted undesired high frequency, and the second low pass filter means 40 inhibits the transmission of the undesired high frequency. The high frequency filter means 50 readily transmits either the undesired high frequency or the phase inverted undesired high frequency. The undesired high frequency which might be partially transmitted by the low pass filter means 30 and 40 is cancelled at the high pass port 26. Partial cancellation reduces the magnitude of the undesired high frequency at the first common port 20.

The complementary filtering and phase inversion means 60 also acts to impede undesired frequencies present at the first common port 20 from appearing at either the low pass port 24 or the high pass port 26. For example, should an undesired high frequency signal be inadvertently transmitted by the first low pass filter means 30, the same signal will be transmitted through the high pass filter means 50 and by the second low pass filter means 40. Because the second low pass filter means 40 has substantially identical band pass characteristics as the first low pass filter means 30, the same undesired high frequency will be inadvertently transmitted through the second low pass filter means 40. The complementary filtering and phase inversion means 60 phase inverts this undesired high frequency thereby effecting partial cancellation of the undesired high frequency at the low pass port 24. Similarly, undesired low frequencies are canceled at the high pass port 26.

The cancellation property of the hybrid filter operates at all frequencies. Any frequency applied to the first common port 20 will be cancelled at the second common port 22. Any frequency applied to the second common port 22 will be cancelled at the first common port 20. Any frequency applied to the low pass port 24 will be cancelled at the high pass port 26. Any frequency applied to the high pass port 26 will be cancelled at the low pass port 24.

The preceding description of operation of the hybrid filter readily illustrates how the arrangement of circuit elements acts to separate the high frequencies from the low frequencies and to eliminate the effect of undesired frequencies. In addition to frequency filtering, the hybrid filter has a constant input impedance equal to the characteristic impedance of the transmission line to which the hybrid filter is connected. The input impedance is constant and independent of frequency if critical values of circuit elements are employed and the following requirements are met. A transmission line or impedance equal to the value of the characteristic impedance of the transmission line must be connected to each port of the hybrid filter. Inductors 31, 32, 41, and 42 must be of value $L$. Capacitors 51, 52, 61, and 62 must be of value $C$. $L$ and $C$ are related to the crossover frequency $f_c$, the frequency which separates the high and low band pass frequency responses, by the well-known resonance equation $f_c=[2\pi(LC)^{1/2}]^{-1}$. $L$ and $C$ are further related by the equation $L=2.4516316R^2C$, where $R$ is the characteristic impedance of the transmission line. Further, capacitors 33 and 43 must be of value $C/K$, inductor 53 must be of value $KL$, and the center-tapped inductor 63 must have shunt inductance of value $KL$, where $K$ equals 0.34444. Values of circuit elements conforming to the above requirements provide a hybrid filter of constant input impedance independent of frequency. If other symmetrical values of circuit elements are used, the hybrid filter does not provide constant input impedance independent of frequency, but it does provide the other features dependent on symmetry.

Although one specific embodiment of the hybrid filter has been shown and described, those skilled in the art will perceive changes and modifications without departing from the invention. For example, there are wellknown methods for constructing filters which are equivalent to those disclosed, such as the substitution of TT filters for the T filters. Therefore, it is intended by the appended claims to cover all such changes and modifications as fall within the true spirit and scope of the invention.

What is claimed as new and desired to be secured by Letters Patent of the United States is:

1. A hybrid filter comprising:

a. a first common port;

b. a second common port;

c. a low pass port d. a high pass port;

e. first and second low pass filter means, said first low pass filter means electrically connecting said first common port and said low pass port, said second low pass filter electrically connecting said second common port and said high pass port, and said first and second low pass filter means having substantially identical band pass frequency responses;

f. high pass filter means electrically connecting said first common port and said high pass port, and said high pass filter means having a band pass frequency response higher than frequency response of said first or second low pass filter means; and g. complementary filtering and phase inversion means electrically connecting said second common port and said low pass port, and said complementary filtering and phase inversion means having a band pass frequency response substantially identical to the band pass frequency response of said high pass filter means and further having a capability for phase inverting undesired frequencies to effect cancellation of the undesired frequencies.

2. The hybrid filter as recited in claim 1, wherein:

a. said first and second low pass filter means comprise low pass $T$ filters; and b. said high pass filter means comprises a high pass $T$ filter.

3. The hybrid filter as recited in claim 2 wherein said complementary filtering and phase inversion means comprises:

a. first and second capacitors; and b. an inductor having a center tap and being electrically connected between said first and second capacitors.

4. The hybrid filter as recited in claim 3 wherein:

a. said low pass $T$ filters have inductors of value $L$ and capacitors of value $C/K$;

b. said high pass $T$ filter has capacitors of value $C$ and an inductor of value $KL$;

c. the first and second capacitors have a value of $C$ and the inductor having a center tap has an effective value of $KL$ in the complementary filtering and phase inversion means, where $K$=0.34444, $L$=2.4516316$R^2C$, and $f_c=[2\pi(LC)^{1/2}]^{-1}$, where $R$ is a value of the impedance characteristic of a transmission line to which the hybrid filter is adapted to be connected and $f_c$ is a crossover frequency separating the band pass frequency responses of said low and high pass filter means.

* * * * *